US008624921B2

(12) United States Patent
McGreevy et al.

(10) Patent No.: US 8,624,921 B2
(45) Date of Patent: Jan. 7, 2014

(54) INDUSTRIAL AUTOMATION VISUALIZATION SCHEMES EMPLOYING OVERLAYS

(75) Inventors: Robert Joseph McGreevy, Oswego, IL (US); Micheal John Pantaleano, Willoughby, OH (US); Bruce Gordon Fuller, Edmonton (CA); Ian Edward Tooke, Barrie (CA); Kevin John Albert, Elm Grove, WI (US); John Joseph Baier, Mentor, OH (US); Jan Pingel, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 930 days.

(21) Appl. No.: 12/242,159

(22) Filed: Sep. 30, 2008

(65) Prior Publication Data

US 2010/0079488 A1 Apr. 1, 2010

(51) Int. Cl.
*G09G 5/00* (2006.01)
*G06T 11/20* (2006.01)
*G09G 5/14* (2006.01)
*G06T 11/00* (2006.01)
*G06T 19/00* (2011.01)

(52) U.S. Cl.
CPC *G09G 5/14* (2013.01); *G06T 11/00* (2013.01); *G06T 19/00* (2013.01)
USPC ........... 345/629; 345/633; 345/440; 345/441; 345/442; 345/443; 345/440.1; 345/440.2

(58) Field of Classification Search
CPC ........... G09G 5/14; G06T 11/00; G06T 19/00
USPC ................................ 345/440–442; 700/19–83
See application file for complete search history.

(56) References Cited

U.S. PATENT DOCUMENTS

| 8,127,241 | B2* | 2/2012 | Blevins et al. | 715/771 |
| 8,332,773 | B2* | 12/2012 | Husoy et al. | 715/777 |
| 2003/0105535 | A1* | 6/2003 | Rammler | 700/17 |
| 2004/0225955 | A1* | 11/2004 | Ly | 715/500 |
| 2006/0241792 | A1* | 10/2006 | Pretlove et al. | 700/83 |
| 2007/0078526 | A1* | 4/2007 | Bromley et al. | 700/19 |
| 2007/0142941 | A1* | 6/2007 | McGreevy et al. | 700/83 |
| 2008/0189638 | A1* | 8/2008 | Mody et al. | 715/771 |
| 2009/0089232 | A1* | 4/2009 | Baier et al. | 706/45 |
| 2009/0222752 | A1* | 9/2009 | Wall et al. | 715/771 |
| 2010/0088627 | A1* | 4/2010 | Enkerud et al. | 715/777 |

* cited by examiner

*Primary Examiner* — Jin-Cheng Wang
(74) *Attorney, Agent, or Firm* — Turocy & Watson, LLP; Alexander R. Kuszewski; John M. Miller

(57) ABSTRACT

A visualization system utilizing preconfigured overlay models and data models to create overlay displays representing different views of the same data or a single view of different data. The visualization system provides for collecting and sharing overlay displays and data sets with other communicatively connected visualization systems. The overlays can be automatically created by the visualization system and can be presented in different formats such as a three-dimensional or a translucent display.

21 Claims, 13 Drawing Sheets

INDUSTRIAL AUTOMATION VISUALIZATION SCHEMES EMPLOYING OVERLAYS

TECHNICAL FIELD

The subject invention relates generally to industrial control systems, and more particularly to visualization systems that interact with industrial control systems based in part on presenting detailed graphical images and charts based on overlaying different representations of single or multi-sourced data.

BACKGROUND

Industrial controllers are special-purpose computers utilized for controlling industrial processes, manufacturing equipment, and other factory automation, such as data collection or networked systems. One type of industrial controller at the core of an industrial control system is a logic processor such as a programmable logic controller (PLC) or personal computer (PC) based controller. Programmable logic controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs.

Connected to the PLC are input/output (I/O) devices. I/O devices provide connection to the PLC for both automated data collection devices such as limit switches, photoeyes, load cells, thermocouples, etc. and manual data collection devices such as keypads, keyboards, pushbuttons, etc. Differences in PLCs are typically dependent on number of I/O they can process, amount of memory, number and type instructions and speed of the PLC central processing unit (CPU).

Another type of industrial controller at the core of an industrial control system is the process controller of a distributed control system (DCS). The process controller is typically programmed by a control engineer for continuous process control such as an oil refinery or a bulk chemical manufacturing plant. A control engineer typically configures control elements such as proportional-integral-derivative (PID) control loops to continuously sample the I/O data, known as the process variable, from the process, compare the process variable to a configured set point and output an error signal, proportional to the difference between the set point and the process variable, to the control device. The control device then adjusts the element controlling the process property, such as a valve in a pipe for flow control or a heating element in a distillation column for temperature control, in an attempt to minimize the error signal. As the DCS name implies, many process controllers are distributed around the process and are communicatively coupled to each other forming the overall control system.

Connected to the process controller are similar types of I/O devices as connected to the PLC and additionally, intelligent I/O devices more common to the process control industry. These intelligent devices have embedded processors capable of performing further calculations or linearization of the I/O data before transmission to the process controller.

A visualization system is generally connected to the industrial controller to provide a human-friendly view into the process instrumented for monitoring or control. The user of a visualization system configures one or more graphical displays representing some aspect of the process the industrial controller is controlling or monitoring. The graphical displays each contain a user configured number of data values collected from the I/O connected to the industrial controller and considered by the user as relevant to the particular graphical display or process area of interest. Other data points may be configured strictly for archival purposes or to generate reports related to interests such as production, downtime, operator efficiency, raw material usage, etc.

Although the visualization system effectively represents the process of interest and provides a means for the operator to monitor or control the process, the use of the data collected by the visualization system does not lend itself to easy analysis. The user must pre-configure charts and displays based on a preconceived notion of how the data should be presented. Changing a representation of a graphical display or chart is tedious and sometimes unallowable based on the particular security configuration of the visualization system. Representing a data set in different formats based on the desired information presentation requires creating different charts and switching from one chart to another to view the differently formatted data. Similarly, viewing data from multiple sources requires a preconceived understanding of which data to present together on which chart. Knowledge usually not known at visualization configuration time or if known, susceptible to change based on changing process conditions.

The mechanism of pre-configuration of graphic displays and charts and the inflexibility of changing the representation of the data or adding additional data sources for simultaneous display has created market pressure for a more flexible system of data representation. Additionally, the market is demanding more sophisticated data representations including three dimensional displays and charts with similar flexibility to adapting the display to changing process conditions.

SUMMARY

The following presents a simplified summary in order to provide a basic understanding of some aspects described herein. This summary is neither an extensive overview nor is intended to identify key/critical elements or to delineate the scope of the various aspects described herein. Its sole purpose is to present some concepts in a simplified form as a prelude to the more detailed description presented later.

A visualization system is communicatively coupled to an industrial control system and configured with a series of graphic displays and charts. The graphic displays are designed to represent the process under control and provide the ability to display current process conditions and download data to the industrial controllers. The charts are designed to represent selected data based on rules defined for the chart. The graphic displays and charts provide the framework for displaying a data set in multiple or overlay formats in both a real-time and a historical data fashion.

Additionally, the graphic display or the chart can display data different data sets simultaneously to provide a deeper analytical view into the monitored process. For example, historical data and real-time data of the same data points can be displayed simultaneously on a graphic display to allow a comparison of process activity from yesterday with real-time process activity. In another example, a work order can be viewed on a chart with overlay data reflecting process efficiency and process downtime thus allowing a visual correlation between these two aspects of the work order data.

In another aspect, process data can be represented in a three dimensional fashion or in a translucent fashion allowing disparate date to be viewed together for an investigation of relationships between the disparate data. When selecting the data sources for inclusion on a graphic display or chart, the framework provides automatic formatting of the individual overlay so the user is not required to reconfigure the graphic display or chart before displaying the data. The rules associated with the automatic format can be the default rules provided by the visualization overlay system or they may be modified by the user to provide specific formatting based on the monitored process.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
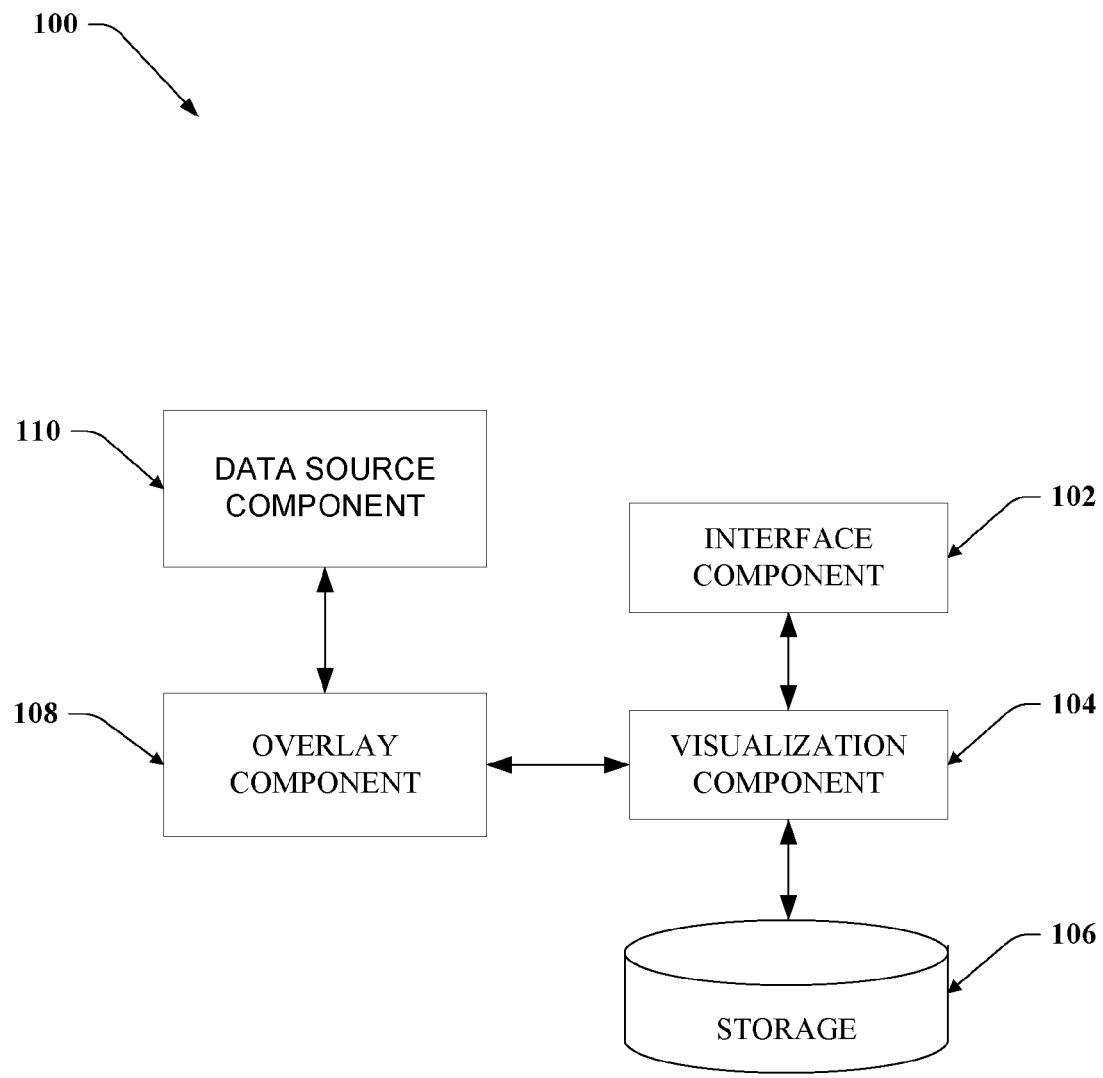
FIG. 1 illustrates an embodiment of a visualization system for employing overlay representations of industrial process data.

Systems and methods are provided enabling the user to configure a visualization system to allow the operator to instruct the visualization system to overlay different data sets and representations of the data sets on a single display graphic or chart. The operator can also select a preconfigured overlay and data set based on models created and stored for future use. The selected data sets are automatically scaled for the overlay display based on the rules, filters, models and security settings applicable at the time the data sets are applied to the overlay. The overlay and data set combinations, either created on based on current circumstances or preconfigured can be shared with other visualization systems communicatively connected to the creating visualization system.

It is noted that as used in this application, terms such as "component," "display," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith. Additionally, it is noted that as used in this application, terms such as "system user," "user," "operator" and the like are intended to refer to the person operating the computer-related entity referenced above.

As used herein, the term to "infer" or "inference" refer generally to the process of reasoning about or inferring states of the system, environment, user, and/or intent from a set of observations as captured via events and/or data. Captured data and events can include user data, device data, environment data, data from sensors, sensor data, application data, implicit and explicit data, etc. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is also noted that the interfaces described herein can include a Graphical User Interface (GUI) to interact with the various components for providing industrial control information to users. This can include substantially any type of application that sends, retrieves, processes, and/or manipulates factory input data, receives, displays, formats, and/or communicates output data, and/or facilitates operation of the enterprise. For example, such interfaces can also be associated with an engine, editor tool or web browser although other type applications can be utilized. The GUI can include a display having one or more display objects (not shown) including such aspects as configurable icons, buttons, sliders, input boxes, selection options, menus, tabs and so forth having multiple configurable dimensions, shapes, colors, text, data and sounds to facilitate operations with the interfaces. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

Additionally, it is also noted that the term industrial controller as used herein includes both PLCs and process controllers from distributed control systems and can include functionality that can be shared across multiple components, systems, and or networks. One or more industrial controllers can communicate and cooperate with various network devices across a network. This can include substantially any type of control, communications module, computer, I/O device, Human Machine Interface (HMI)) that communicate via the network which includes control, automation, and/or public networks. The industrial controller can also communicate to and control various other devices such as Input/Output modules including Analog, Digital, Programmed/Intelligent I/O modules, other programmable controllers, communications modules, and the like. The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Referring initially to FIG. 1, a data overlay visualization system 100 for displaying multiple representations of one or more data sets is depicted. It should be appreciated that the representation of the one or more data sets by the data overlay visualization system 100 can include but is not limited to translucent overlays as well as three dimensional data representations in either display graphic or chart format. The data overlay visualization system 100 can be preconfigured with rules and models or it can be configured by user selection in real-time as circumstances dictate.

It is contemplated that data overlay visualization system 100 can form at least part of a human machine interface (HMI), but is not limited thereto. For example, the data overlay visualization system 100 can be employed to facilitate creating a visualization system related to automation control systems, devices, and/or associated equipment (collectively referred to herein as an automation device(s)) forming part of a production environment. Data overlay visualization system 100 includes interface component 102, visualization component 104, storage component 106, overlay component 108 and data source component 110.

The interface component 102 is communicatively connected to Input/Output devices. The interface component 102 provides for object or information selection, input can correspond to entry or modification of data. Such input can affect the configuration, graphic display, reports and/or automation devices. For instance, an operator can select a data set model and an overlay model to instruct the data overlay visualization system 100 to retrieve, scale and display process data using overlays to represent the differently formatted data. Additionally or alternatively, a user can modify automation device parameters or provide a verbal description of the data sets and representations used to create the overlay. By way of example and not limitation, a user can select a work order for display and analysis. The user can then choose to look at efficiency and downtime related to the selected work order as overlays presented on the graphical display or chart. It should be noted that input need not come solely from a user, it can also be provided by automation devices. For example, warnings, alarms, production data and maintenance schedule information, among other things, can be provided with respect to displayed devices and used to automatically select data sets and overlays.

The interface component 102 receives input concerning displayed objects and information. Interface component 102 can receive input from a user, where user input can correspond to overlay or data set identification, selection and/or interaction therewith. Various identification mechanisms can be employed. For example, user input can be based on positioning and/or clicking of a mouse, stylus, or trackball, and/or depression of keys on a keyboard or keypad with respect to displayed information. Furthermore, the display device may be by a touch screen device such that identification can be made based on touching a graphical object. Other input devices are also contemplated including but not limited to gesture detection mechanisms (e.g., pointing, gazing . . . ) and voice recognition.

The interface component 102 may also receive automated input data from the industrial controller which in turn has received input data from the various devices communicatively connected to the industrial controller. Examples of this input data are temperatures, pressures, flow rates, mass, volume, elapsed time counts and other such information available from an industrial process. The interface component 102 may also transmit modified data to the industrial controller(s) to reflect any changes made by the overlay component 108 or the data source component 110. For example, if the operator changed the value of a set point for a PID control loop based on information generated by displaying an overlay chart of set point value and production rate, the change could be transmitted to the industrial controller implementing this PID control loop. In another example, the interface component 102 can transmit an updated preconfigured overlay or data set model to another operator located at another computer communicatively coupled to the computer updating the production problem solution.

The visualization component 104 presents the configured overlay graphic displays or charts to the operator for monitoring and controlling the process. One or more of the configured displays or charts contain overlay objects allowing the operator to select data sets and overlay data representations based on current circumstances of the monitored process. For example, the operator can drag and drop a data set onto the existing chart and the visualization component will present a composite display of the current real-time or historical data on the display and the newly selected real-time or historical data automatically scaled to match the scale of the currently displayed data. In another example, the operator can select a preconfigured overlay model incorporating a preselected data set most closely matching the desired display. In another example, the operator can archive the current overlay display and data sets to the storage component 106 as a new model.

The visualization component also provides the ability to create the graphic images representing the process, including the solution object. The visualization component is communicatively coupled to the solution logging component allowing solution logging component to identify the process area of interest based on the selection of the solution component.

The storage component 106 provides the ability to archive preconfigured overlay models, overlay charts, overlay filters, overlay rules, data set rules, data set models, data set security configuration, reports, recipes, graphical displays and user configured components of the visualization system 100. Additionally, any user generated overlays are archived on the storage component and can be communicated to server data stores 1330 or other visualization system clients 1310.

In another aspect, process data is maintained on the storage component 106 for future review with regards to creating data sets or updating existing preconfigured data models or data rules. The storage component 106 can automatically transfer its database of preconfigured overlay and data set configurations to other server data stores or visualization system clients based on a timed schedule an event such as the modification of a preconfigured overlay model or data set model. For example, if an operator discovers a particularly informative overlay and data set combination and archives the new models to the storage database 106, the visualization system 100 will automatically update all other visualization systems containing the preconfigured overlay and data set models. In this manner, the efficiency of the overall manufacturing operation is improved because any given overlay configuration is available to all other locations of data overlay visualization systems 100. Through this method, a newly hired operator can quickly acquire process operation experience that might have taken years to acquire.

The overlay component 108 provides methods and functionality allowing the user to select overlay display graphics and charts and overlay data sets. The overlay component 108 can present process data communicatively coupled to the data overlay visualization system 100 from the industrial controller or from manual data entry devices communicatively couple to the data overlay visualization system 100. In another aspect the overlay component 108 can predict useful overlay combinations of data set representations based on the history of previous data set combinations selected by the user for a particular overlay display graphic or chart. It is understood that these methods are not mutually exclusive and can be used in any combination.

The data source component 110 provides the user the ability to define and select particular data sets for inclusion in overlay displays of display graphics and charts. The operator can create rules for combining data; create models of data to group together and security necessary to protect sensitive data from individuals not allowed to view the data. In another aspect, the operator can merge existing data models with each other or merge raw real-time data with an existing data model.

Figure 2:
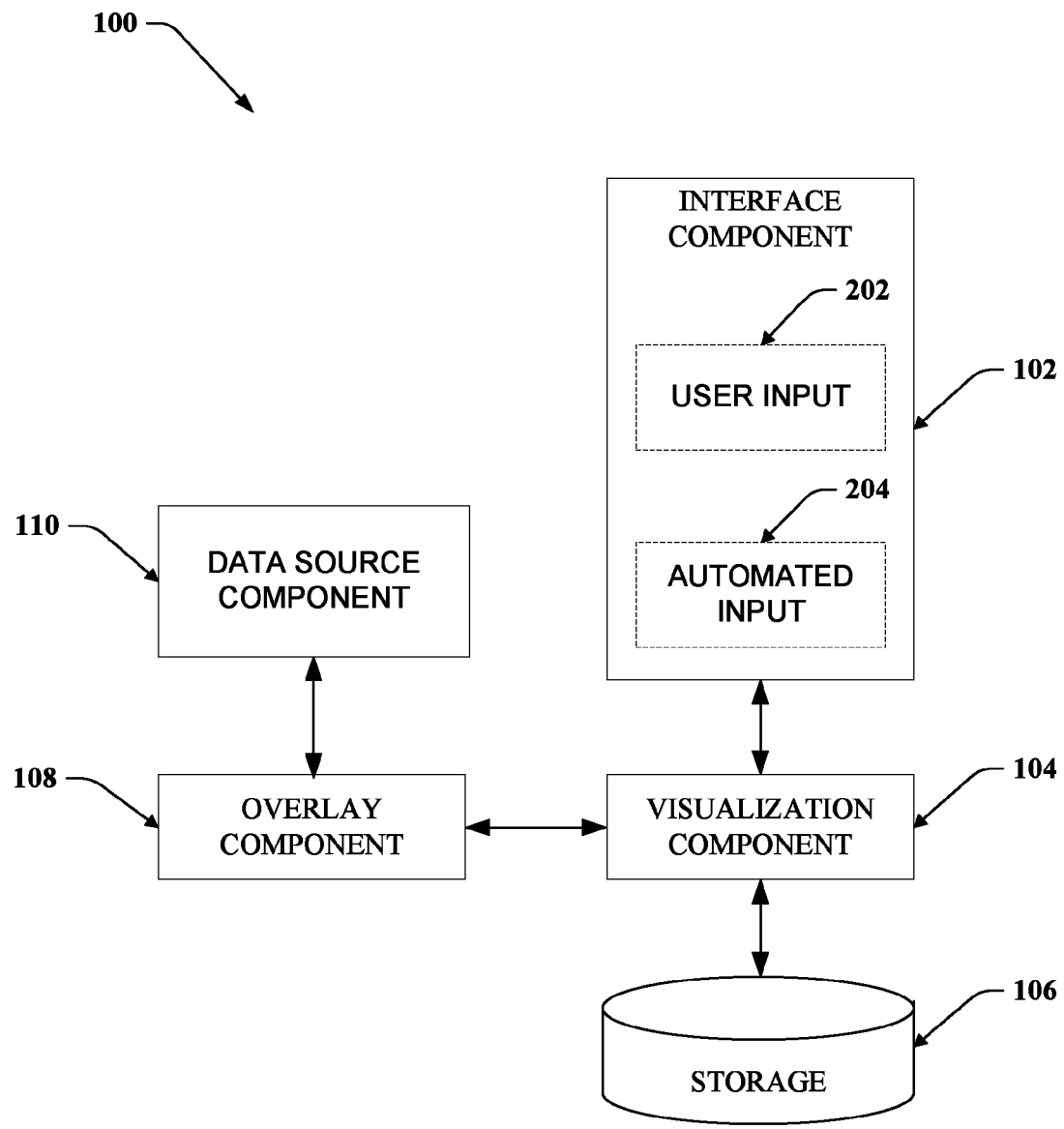
FIG. 2 illustrates an embodiment of a visualization system for employing overlay representations of industrial process data where an interface component allows the collection of automated data and manual data.

Referring next to FIG. 2, the interface component 102 includes user input component 202 and automated input component 204. In one aspect, user input component 202 provides the capability for an operator to input manual data necessary or desired to create a given overlay display. The operator can add this information either before or after selecting a predefined data or overlay model for display. For example, while the operator was reviewing the production rates at a particular machine, the operator can select the same machine on another process line to overlay that machines production rate data and allow a comparison of the similarities or differences in the operation of similar machines on two or more different production lines. At a later time, the operator, using the user input component 202, can add additional information to the overlay model to increase the usefulness of the overlay for future operations or operators. The enhanced overlay and data models can then be communicated to other servers or data overlay visualization systems 100 to decrease overall production downtime by providing greater insight into efficient operation of the process.

In another aspect of the subject innovation, the automated input component 204 provides data from all devices communicatively coupled to the data overlay visualization system 100. For example, if there are programmable or process controllers communicatively connected to the data overlay visualization system 100 then data is automatically sampled from the controllers and made available for inclusion in preconfigured data models or for manual selection by the operator for inclusion in existing models or for the creation of new models.

Figure 3:
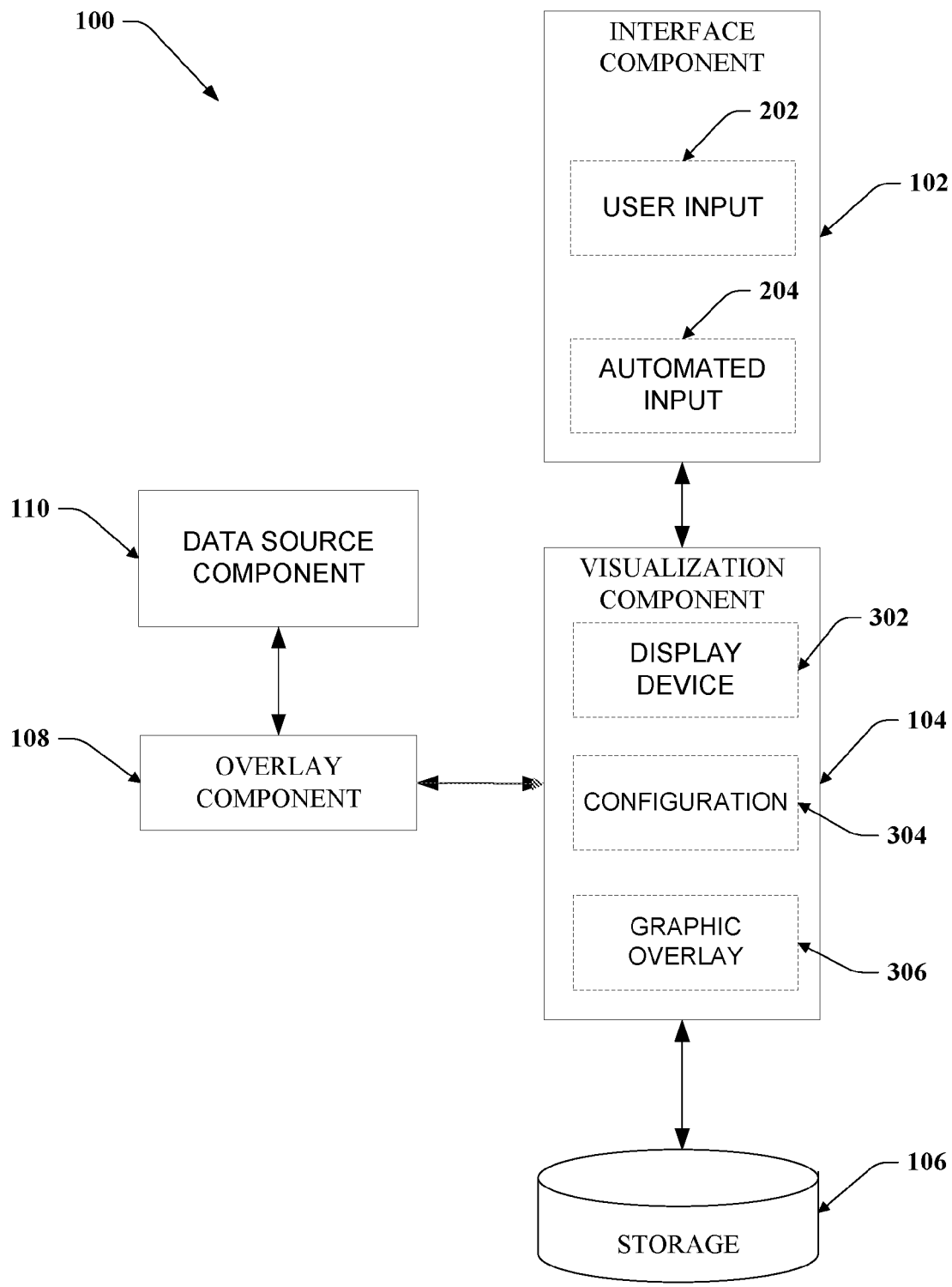
FIG. 3 illustrates an embodiment of a visualization system for employing overlay representations of industrial process data where a visualization component allows the creation, configuration and display of graphic images, charts and overlays.

Referring next to FIG. 3, the visualization component 104 includes a display device component 302, a configuration component 304 and a graphic overlay component 306. In one aspect, the display device component 302 provides a device for rendering a graphic image allowing the operator to monitor the process. A part of the graphic image includes the graphical representation of an overlay object 306 for operator interaction. The overlay object 306 can appear as a menu system or as an icon for dragging and dropping overlay displays or charts and overlay data sets onto a graphic display or chart. For example, the user can configure an icon labeled "Overlay Portal" and when the operator selects overlay graphics or charts and uses the pointing device to drag them to the overlay object 306 icon and releases them, the overlay object 306 interacts with the overlay component 108 to display the overlay on the existing graphic display.

In a similar fashion, if the user selects a data set and drops it on the overlay object 306 icon, the overlay object 306 interacts with the data source component 110 to scale the data, apply the appropriate rules for the data and verify the applicable security model allows access to the selected data before displaying the data on the overlay display. It should be noted that the overlay object 306 can be represented as any shape configurable by the visualization system and the operator may select other methods of activating the overlay object.

In another aspect, the configuration component 304 provides for creating graphical displays representing the process and equipment of interest. A part of creating the graphical display can include creating an overlay object 306 for inclusion on the graphical display. Configuring the overlay object can include selecting overlay models, rules and filters for later use by the overlay object. The overlay object 306 can act as a selection point for a menu system allowing the operator to navigate the list of available overlays and data sets and select overlays and data sets of interest for display.

Configuration component 304 can also allow the configuration of an automatic overlay display. For example, specific data points and their associated values can be monitored and triggers can be established for the data reaching a specified value. At the occurrence of this data event, the overlay object 306 can automatically load predefined overlay displays and data sets and direct the operators' attention to these displays. In another aspect, the configuration component 304 can provide for the operator to modify the overlay strategy at the time the overlay object is activated. For example, in displaying a particular overlay of a new piece of equipment, the operator can decide that the downtime data set is more relevant to his current activities than the production data set under review. The operator can instruct the overlay object 306 to remove the production data overlay and insert the downtime overlay without the requirement of creating a series of new models for this purpose. If desired, the operator may save this new configuration to the storage component 106 as a new overlay model for future use.

Figure 4:
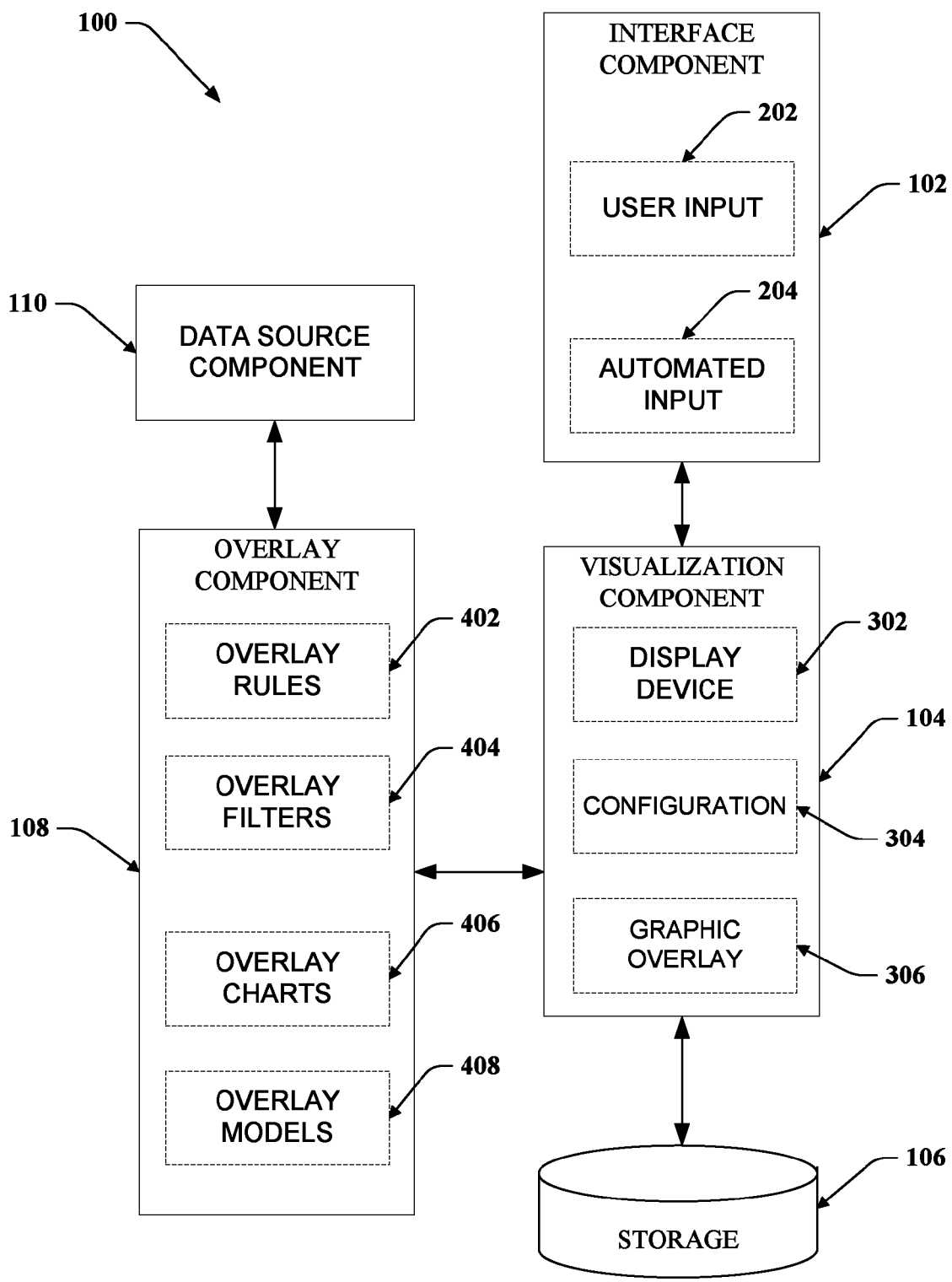
FIG. 4 illustrates an embodiment of a visualization system for employing overlay representations of industrial process data where an overlay component allows the configuration of overlay rules, filters, charts and models.

Referring to FIG. 4, the overlay component 108 includes overlay rules component 402, overlay filters component 404, overlay charts component 406 and overlay models component 408. In one aspect, the overlay rules component 402 allows the user to configure rules defining which overlay display graphics or charts are allowed to coexist with the present overlay graphic. For example, the user can configure a rule that production information from different products, even if run on the same line are not permitted to coexist as overlays. The different products have different operational parameters and expending resources on an overlay comparison would only mislead the operator in tuning process operation or determining a problem. Conversely, in another aspect of the subject innovation, the user can configure a rule that production information from different lines can coexist on an overlay if the data set is from the same product. This overlay scenario is useful in determining a most efficient manufacturing technique for a particular product.

In another aspect of the subject disclosure, the user can configure rules determining which graphical displays are allowed to present overlays and when they are allowed to present them. For example, the user can configure a data overlay visualization system 100 such that the overview display is not permitted to present overlay displays and that the downtime overlay display is only permitted to display overlays during periods of current downtime at the data overlay visualization system 100 responsible for operating the process.

In another aspect, the user can configure the data overlay visualization system 100 to automatically present particular predefined overlays based on the current values of data automatically collected from a programmable or process controller. For example, when a particular data value sampled by the data overlay display visualization system 100 indicates that a particular machine is down, an overlay rule can instruct the data overlay visualization system 100 to present the overlay display or chart predefined for this downtime condition. The configuration can instruct the data overlay visualization system 100 to keep this overlay display loaded until the operator manually changes the display or to automatically revert to the previous display if the downtime condition is resolved.

The overlay filters component 404, in another aspect of the subject invention, provides the ability of the data overlay visualization system 100 to eliminate particular data sources from the overlay display or to require a particular data source in the overlay display if another key data source is included in the overlay display. For example, whenever a production rate overlay display is selected, the overlay filter component 404 can prevent the inclusion of any downtime data because of the inconsistency of the request. In another aspect, when a production rate overlay is displayed, the overlay filter component 404 can include all required production data in the overlay display, even if some of the required production data was unintentionally excluded from the configuration.

The overlay charts component 406, in another aspect, provides the ability to include any data available to the data overlay visualization system 100 from the industrial or process controller in an overlay chart such as but not limited to a bar, stacked bar, pie, line, scatter or statistical chart. The overlay chart can be represented in a translucent or three-dimensional visualization but is not limited to these representations. In another aspect of the subject innovation, the overlay chart can be a table of data representing raw or scaled data values from the industrial controller. The overlay chart can simultaneously represent data acquired in real-time in conjunction with historical data from the same or a different data overlay visualization system 100.

In another aspect of the subject innovation, the overlay models component 408 provides the ability to group all of the configuration information related to a preconfigured overlay display into a single entity that the user can select or distribute to other data overlay display systems 100. The overlay models 408 are archived on the storage component 106 and can be modified or deleted as the user requires.

Figure 5:
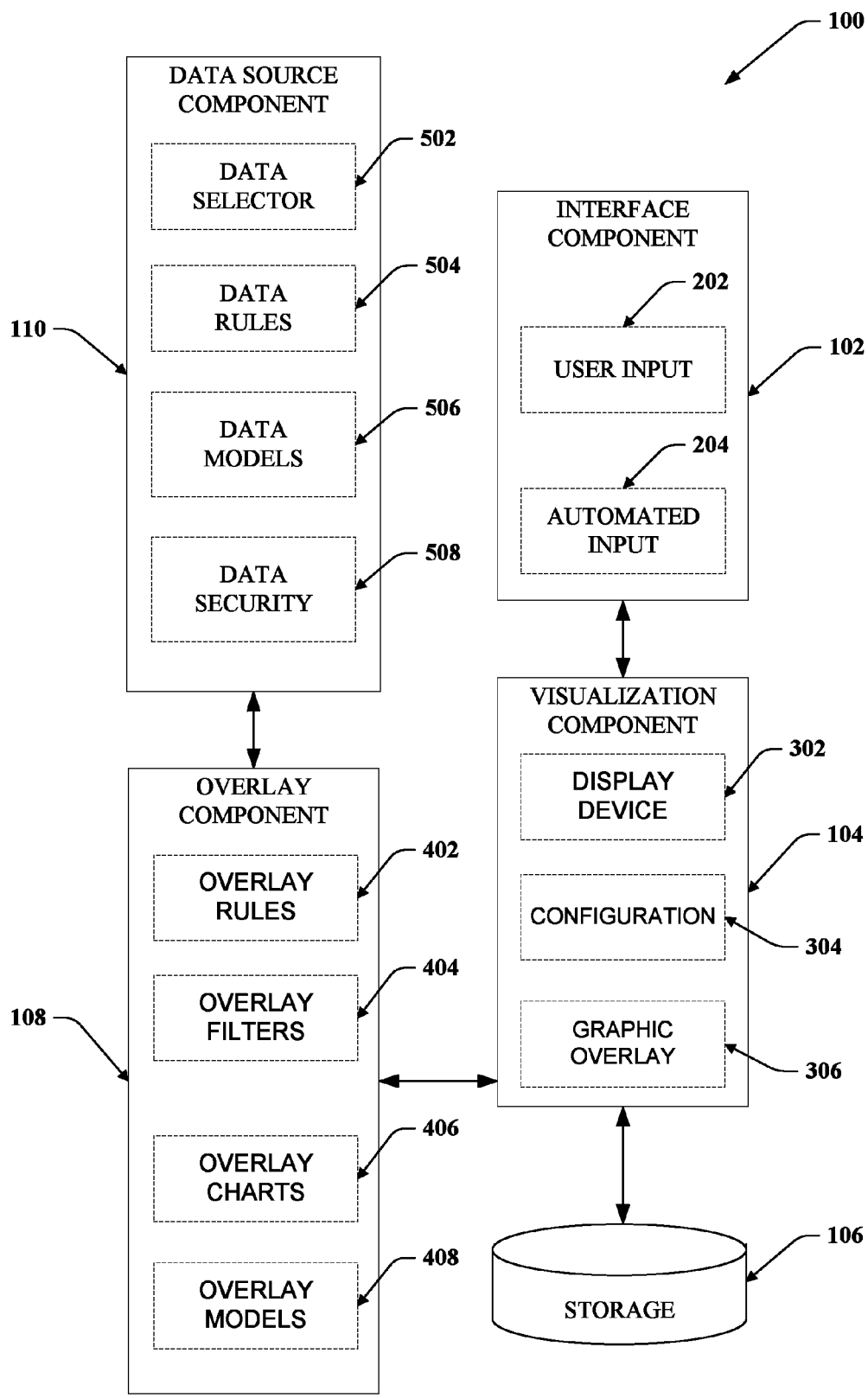
FIG. 5 illustrates an embodiment of a visualization system for employing overlay representations of industrial process data where a data source component allows the operator to select the data source and configure data source rules, models and security.

Referring now to FIG. 5, the data source component 110 includes a data selector component 502, a data rules component 504, a data models component 506 and a data security component 508. In one aspect, the data selector component 502 provides the user the ability to select data sets for inclusion in the overlay display. For example, while viewing a display the operator can select real-time data from another data overlay visualization system 100. In another example, the operator can select historical data from the storage component 106 from either the current data overlay visualization system 100 or a remote data overlay visualization system 100 for inclusion with the real-time data currently displayed. In another example, the operator can select historical data from one or more data overlay visualization systems 100 for inclusion on the overlay display.

In another aspect of the subject invention, the data rules component 504 provides a mechanism for the operator to describe allowable data combinations and scaling to perform on the data before including the data in an overlay display. For example, the user can configure a rule that prevents the production data from a capper machine from overlaying the production data from a labeler machine. In another example, the user can provide scaling for the production data that requires the data to be no more than two weeks apart in terms of age for inclusion on an overlay display. In another example, the user can configure a rule that the data must be from the same product even if the different products are run on the same machine.

In another aspect, the data models component 506 provides a mechanism for collecting the configuration of a data set into an object that the data overlay visualization system 100 can archive on the storage component or transmit to another data overlay visualization system 100 communicatively connected to the subject data overlay visualization system 100. In another aspect, the user can change the configuration of the data model either in an offline system or in real-time as the circumstances of the industrial process require. In another aspect, the data models can be attached to specific graphic displays or charts so the data models are automatically loaded any time the graphic display or chart is loaded.

In another aspect, the data security component 508 provides the ability for the user to configure access security to prevent the viewing of data to those provided permission. In one aspect any operator can be permitted to view downtime data associated with the machine or process but only certain operators are permitted to view production data. In another aspect only management personnel can be permitted to view overlays containing raw material lists and their utilization. In another aspect, operators from one process area can be prohibited from overlaying financial information from another process even though they have access to the financial information from the process assigned to them.

Figure 6:
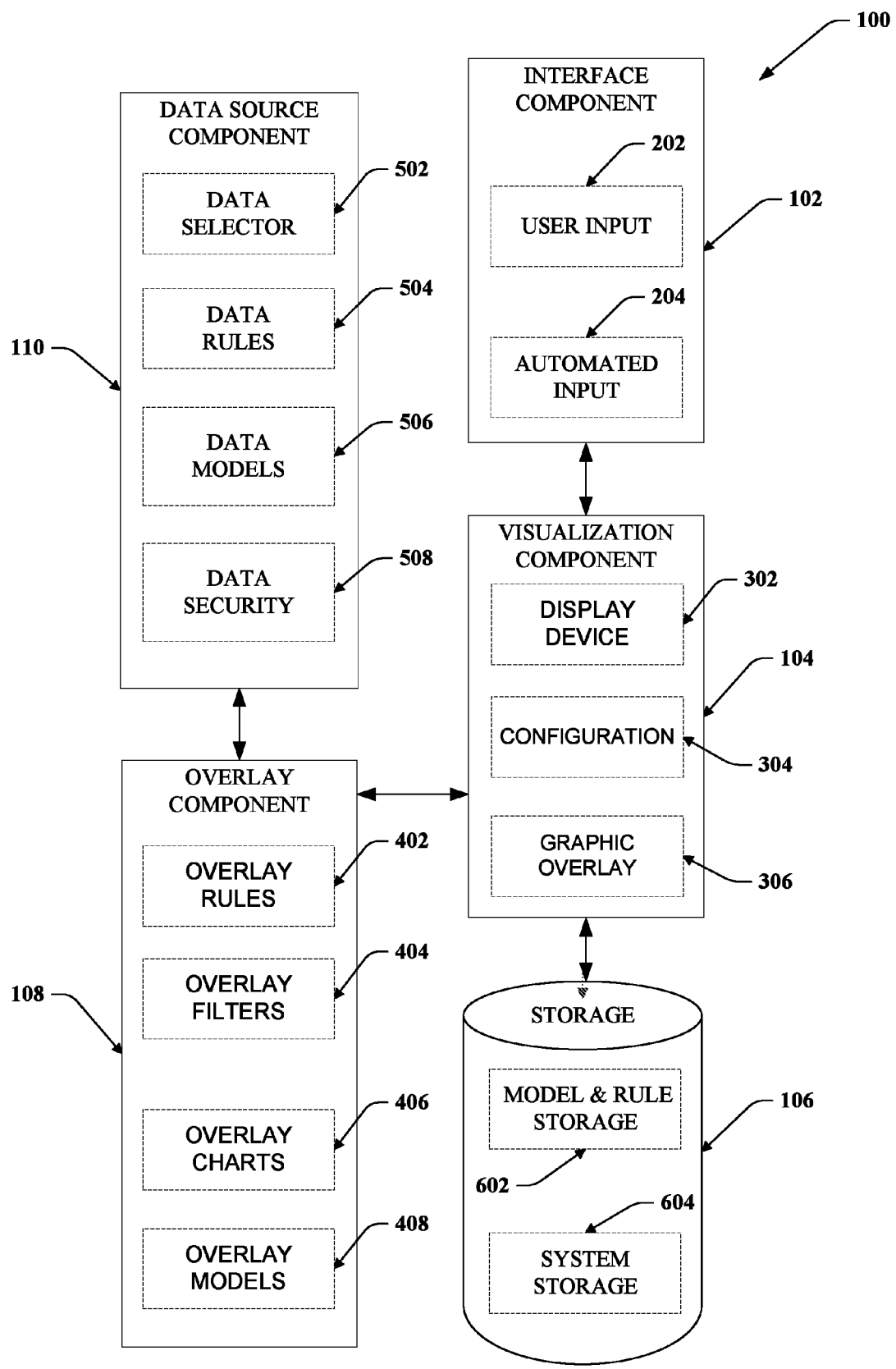
FIG. 6 illustrates an embodiment of a visualization system for employing overlay representations of industrial process data where a storage component allows the visualization system to store data and overlay models and rules and other aspects requiring storage for operation of the visualization system.

Referring now to FIG. 6, the storage component 106 includes a model and rule storage component 602 and a system storage component 604. Storage component 106 can be any suitable data storage device (e.g., random access memory, read only memory, hard disk, flash memory, optical memory), relational database, XML, media, system, or combination thereof. The storage component 106 can store information, programs, historical process data and the like in connection with the data overlay visualization system 100. In one aspect, the model and rule storage component 602 provides the capability to store a plurality of overlay and data models. The overlay and data models can be organized by any criteria and made available for selection by the operator. For example, the operator can choose a preconfigured overlay and data model based on the production line type or on a particular machine operating as part of the production line.

At the operators' discretion, new overlay and data models can be created and stored based on changes to the production line or a particular machine. The operator can also combine multiple overlay and data models to create a new larger overlay and data model. For example, the operator can select a filler machine, a capper machine and a labeler machine to create a preconfigured overlay and data model. The operator can then exclude the detailed information about each machine and include more general information related to the overall production line. When the operator invokes the overlay object of this new model, the newly configured overlay is displayed based on the overlay and data models. The model and rule storage component 602 also allows the overlay and data models to be shared with server data stores 1330 or other data overlay visualization systems 100 through any of the communicatively connected systems.

In another aspect, the system storage component 604 provides storage for all the components required to operate the data overlay visualization system 100 and the process data collected based on operator invocation of the overlay object. As with the preconfigured overlay and data models, the collected process data can be shared among server data stores 1330 or other data overlay visualization systems 100. A maintenance system associated with the system storage component 604 provides for automatically backing up changed preconfigured overlay and data models and process data based on a timed frequency and an indication that the system storage component 604 is reaching full capacity.

Figure 7:
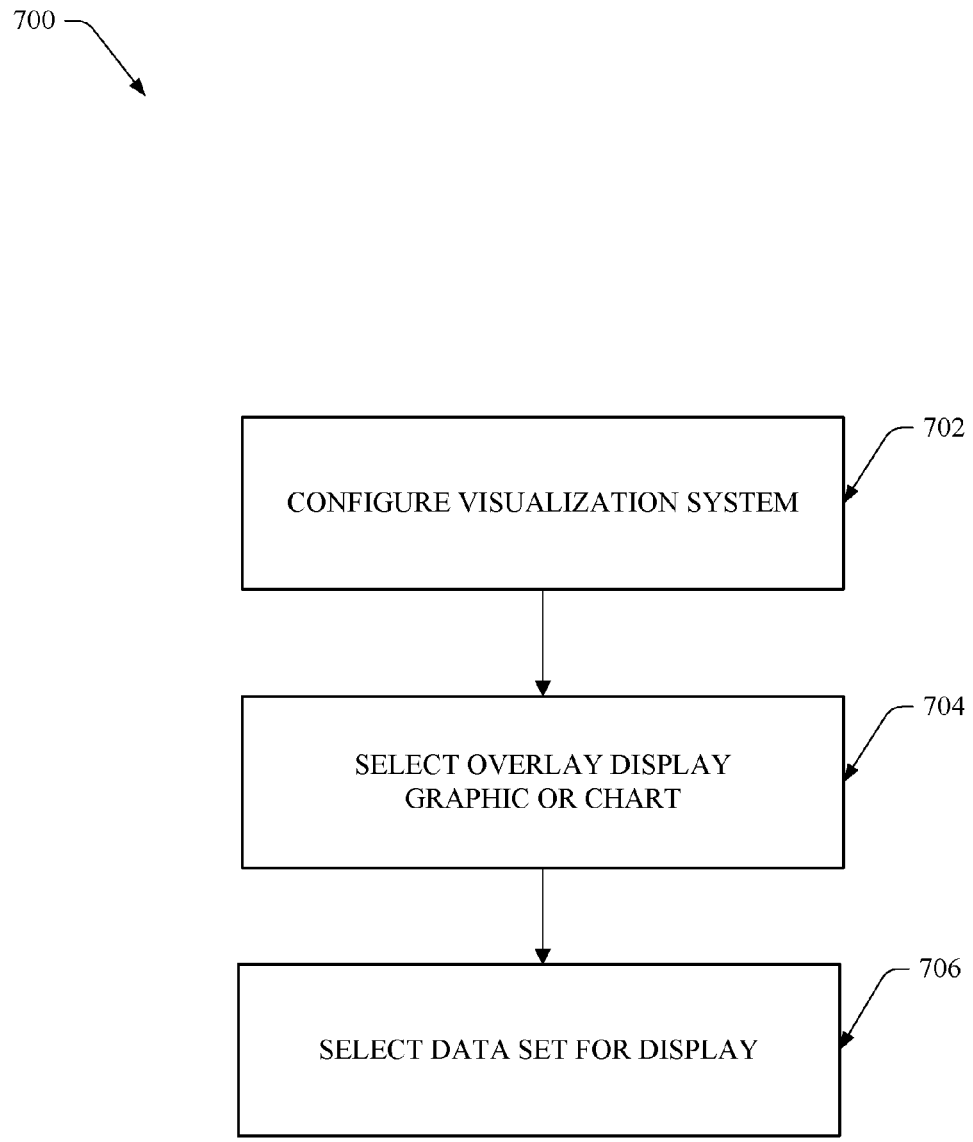
FIG. 7 illustrates a methodology of a visualization system where the system is configured and the overlay and data source are selected.

Referring now to FIG. 7, a method 700 of selecting an overlay display and data set is illustrated. In one aspect at 702, the data overlay visualization system 100 is configured for process operation. The data overlay visualization system 100 configuration includes creating graphic displays representing the process, creating overlay models defining rules and filters for use when selected, creating data models defining rules and security for use when selected and configuring an overlay object to include on one or more of the graphic displays or charts.

In another aspect at 704 of the method 700 of selecting an overlay display and data set, the operator selects the display graphic or chart to overlay on the existing graphic or chart. The operator can use a menu system to make the selection or can drag an icon from another location on the graphic or chart and drop it on the existing display. It should be noted that the operator is not limited to a single selection. The operator can select more than one overlay graphic or chart unless the overlay configuration limits the number or overlay graphics or charts available for overlay.

In another aspect at 706 of the method 700 of selecting an overlay display and data set, the operator can select one or more data sets for inclusion in the overlay display. The selected data sets can be a combination of real-time data from the same data overlay visualization system 100 or data sets of real-time data from different data overlay visualization systems 100. In another aspect, the data can be one or more sets of historical data from the same data overlay visualization system 100 or data sets of historical data from different data overlay visualization systems 100. In another aspect, the operator can select a combination of real-time and historical data from the same or different data overlay visualization systems 100.

Figure 8:
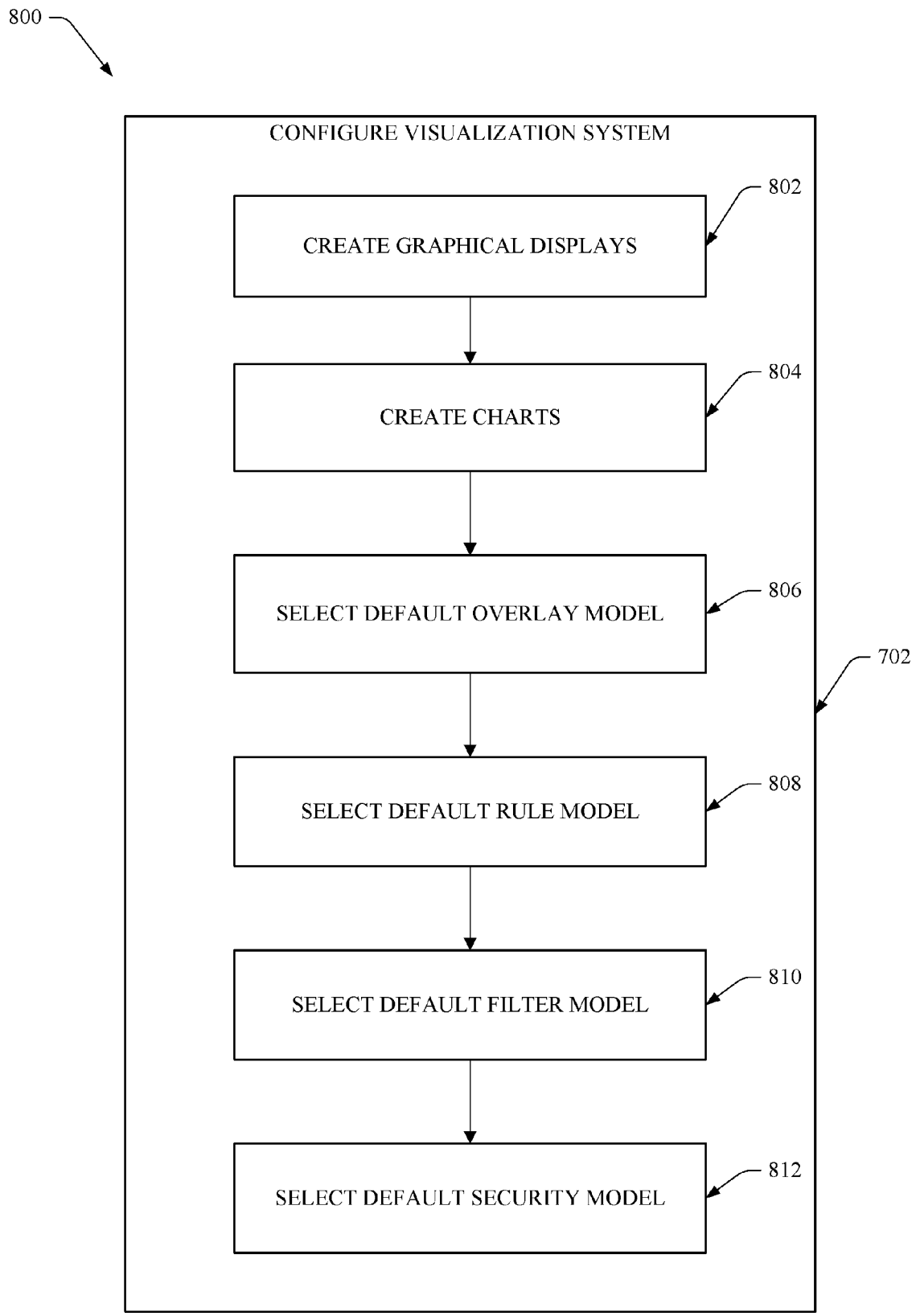
FIG. 8 illustrates a methodology of a visualization system where the graphic displays and charts are created and default selections are made for overlay, rule, filter and security models.

Referring now to FIG. 8, a method 800 is illustrated showing the steps of configuring a data overlay visualization system 100. In one aspect at 802, the user creates the graphic displays that the data overlay visualization system 100 will use as the basis of an overlay or the overlay itself. The created graphic displays can represent the entire industrial process, areas of the industrial process or machines of the industrial process. In another aspect located at 804, the user creates charts that as above can represent the basis of an overlay or the overlay itself. The chart can represent data such as but not limited to production data, downtime data, work order data, raw materials availability data and any other data necessary for the associated manufacturing process. In another aspect of the subject innovation located at 806, the user can select the default overlay model. The default overlay model is the overlay model that will be invoked if the user has not selected a specific overlay model for a particular graphic being displayed when the operator invokes the overlay object. The default overlay model can do nothing or it can present a standard overlay action for each graphic not configured for overlay activity. In a similar fashion, selecting a default rule model as illustrated at step 808, selecting a default filter model as illustrated at step 810 and selecting a default security model as illustrated at step 812 provide the user the ability to configure actions for each of these operations for cases where the user has not configured the corresponding action for any individual display graphic or chart. In one aspect, the user can use this method to configure a data overlay visualization system where the desired overlay activities are the same regardless of the display graphic or chart present when the overlay object is selected.

Figure 9:
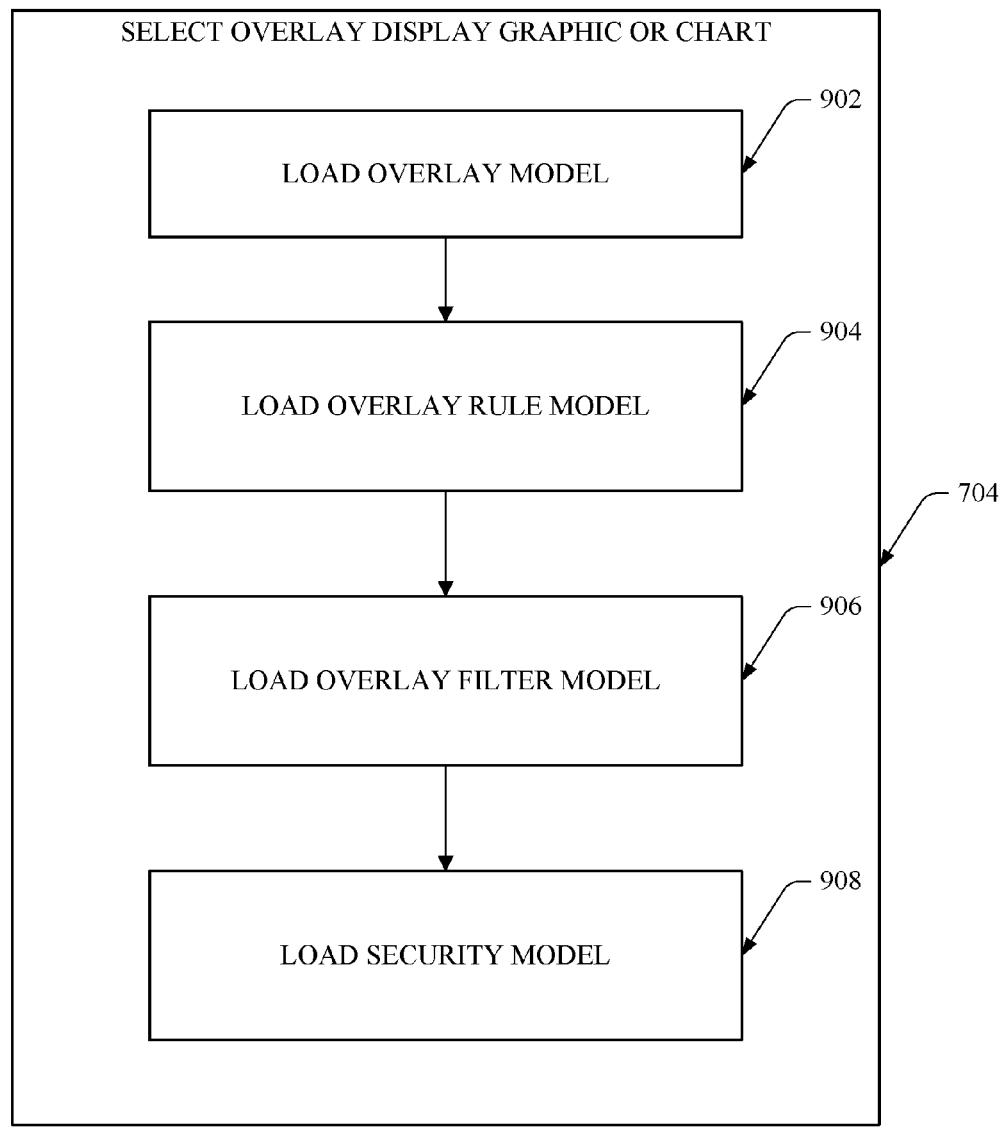
FIG. 9 illustrates a methodology of a visualization system where the overlay, rule, filter and security models are loaded based on the selected overlay graphic display or chart.

Referring now to FIG. 9, a method 900 illustrates selecting an overlay graphic or chart and the actions taken by the data overlay visualization system 100 based on the selection. When the operator makes a selection from the list of available display graphics or charts, the data overlay visualization system 100 loads the corresponding overlay model as indicated at 902. The overlay model is a container holding the other configuration aspects of an overlay graphic or chart. This structure allows the operator to start one model and all other configured aspects associated with the selected overlay graphic display or chart are automatically invoked at the appropriate time or event. For example, once the overlay model is initiated, overlay rule, filter or security models can be started simultaneously or they can be started at a later time based on a clock schedule or the occurrence of a particular event associated with preselected process data.

In another aspect of the subject innovation illustrated at step 904, the overlay rule model is invoked by the overlay model. The overlay rule model is a container for user defined rules relating to how to display overlay data. For example, the overlay rule model can have configuration information instructing the data overlay visualization system 100 in how to scale the display before constructing the overlay. In another aspect, the overlay rule model can instruct the data overlay visualization system with regards to what data is available to overlay on any particular display graphic or chart. For example, an overlay display graphic currently displaying real-time data from a filler machine can be configured to allow only data from another filling machine running the same product to overlay on the current display graphic. In another example, the filler machine display graphic currently displaying real-time data can be configured to allow only historical data from the same filler machine having run the same product. It should be noted that any of the overlay rule models can be modified by the operator from the data overlay visualization system 100 after the model is initiated if desired.

In another aspect of the subject innovation illustrated at step 906, the overlay filter model is invoked by the overlay model. The overlay filter model is a container for user defined filters for configuring which overlays are allowed to be included in a particular overlay display or chart. The user can configure an overlay filter model to either include or exclude particular overlays depending on the particular overlay currently in use or the subject data overlay visualization system 100. For example, the user can configure an overlay filter model to allow only overlays from the subject data overlay visualization system 100 to be included in overlay displays or charts. In another example, the user can configure an overlay filter model to exclude any overlays identified as presenting information intended only for engineers. It should be noted that overlay configuration includes attributes associated with the class of individual identified to view particular overlays.

In another aspect of the subject innovation illustrated at step 908, the overlay security model is invoked by the overlay model. The overlay security model is a container for user defined security associated with the overlay display or chart. The user can configure the overlay security model to require the presentation of specified security credentials before the data overlay visualization system 100 permits the display of the overlay display or chart. For example, the selection of an overlay display or chart that presents financial information related to the profitability of the industrial process or machine can be configured to require the presentation of security credentials known only to managers before the data overlay visualization system 100 permits the viewing of the selected overlay display or chart.

Figure 10:
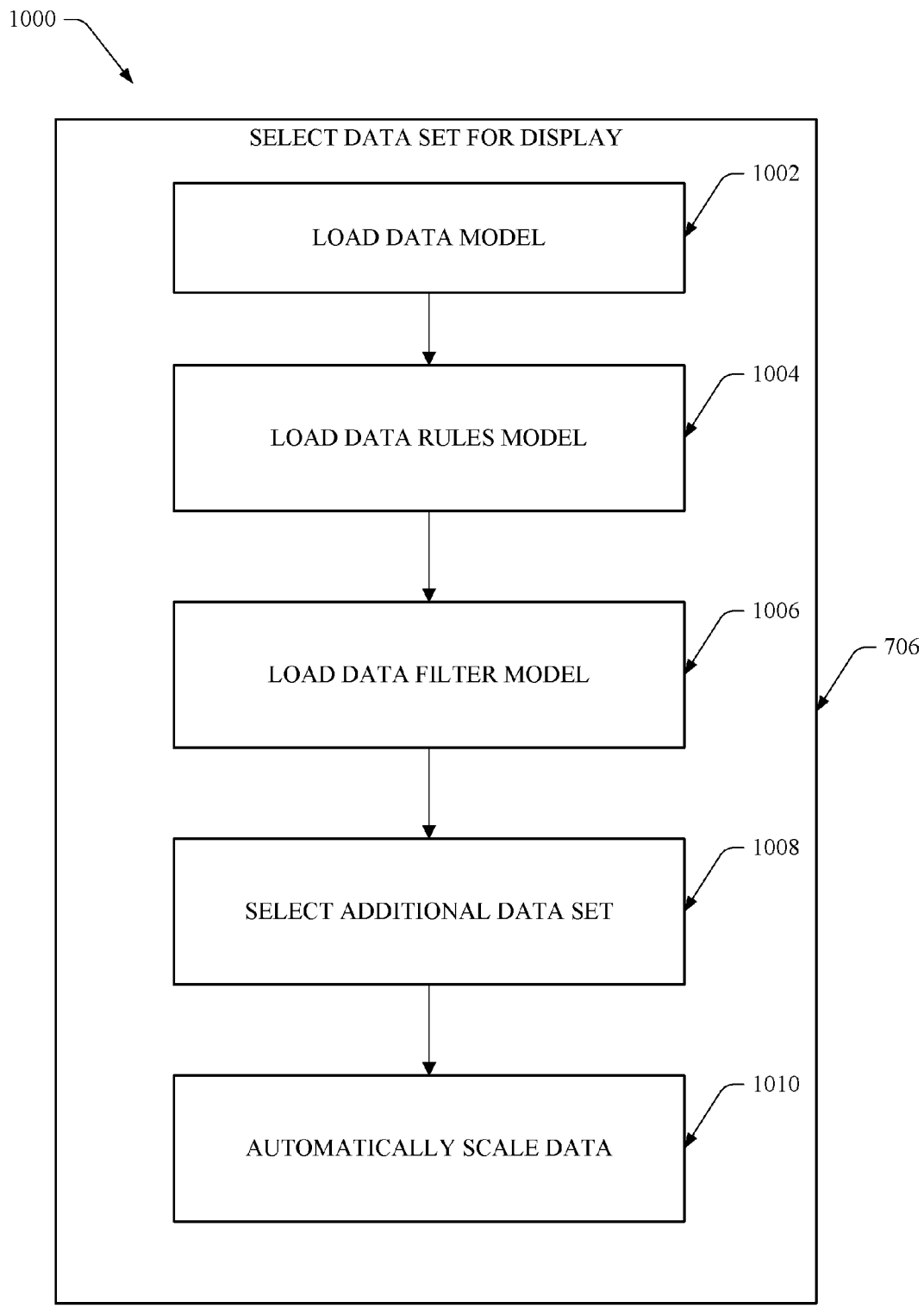
FIG. 10 illustrates a methodology of a visualization system where one or more data sets are selected, loaded and scaled for overlay display.

Referring now to FIG. 10, a method 1000 illustrates selecting a data set for an overlay display or chart and the actions taken by the data overlay visualization system 100 based on the selection. When the operator makes a selection from the list of available data sets for the overlay display graphics or charts, the data overlay visualization system loads the associated data model as indicated at 1002. The data model is a container holding the other configuration aspects of the data set selected for use with the overlay display or chart. This structure allows the operator to start one model and all other configured aspects associated with the data set selected for the overlay graphic display or chart are automatically invoked at the appropriate time or event. For example, once the data model is initiated, data rule and filter models can be started simultaneously or they can be started at a later time based on a clock schedule or the occurrence of a particular event associated with preselected process data. Then, if chosen by the operator, additional data can be included in the overlay display graphic or chart and the data is automatically scaled to match the configuration of the overlay model.

In another aspect of the subject innovation illustrated at step 1004, the data rules model is invoked by the data model. The data rules model is a container for the user configuration associated with determining how data should be scaled and when it is permissible to apply the scaled data to an overlay display graphic or chart. For example, the data rules model can be configured to scale the data included in the data model to a zero to one hundred percent scale before overlaying the data on the specified chart.

In another aspect of the subject innovation illustrated at step 1006, the data filter model is invoked by the overlay model. The data filter model is a container for user defined filters for configuring which data points are allowed to be included in a particular overlay display or chart. The user can configure an data filter model to either include or exclude particular data points depending on the particular application. For example, the user can configure an data filter model to allow only data points from the subject data overlay visualization system 100 to be included in overlay displays or charts. In another example, the user can configure an overlay filter model to exclude any data points identified as presenting information intended only for managers. It should be noted that data point configuration includes attributes associated with the class of individual identified to view particular data points.

In another aspect of the subject innovation illustrated at step 1008, the user can select more than one data set for use on an overlay display graphic or chart. Multiple data sets can overlay each other using a three-dimensional representation or using a translucent display allowing one overlay display to be seen through a subsequent overlay display. It should be noted that the number of overlay displays selected is not limited to any particular number of overlays.

In another aspect, the step at 1010 provides for the automatic scaling of overlay data before presenting the data to the overlay display graphic or chart. The data scaling can be configured based on the overlay in use or on a configuration defined in the data model. The operator can change the scaling after the model is loaded and update the model with the new scaling strategy if desired.

Figure 11:
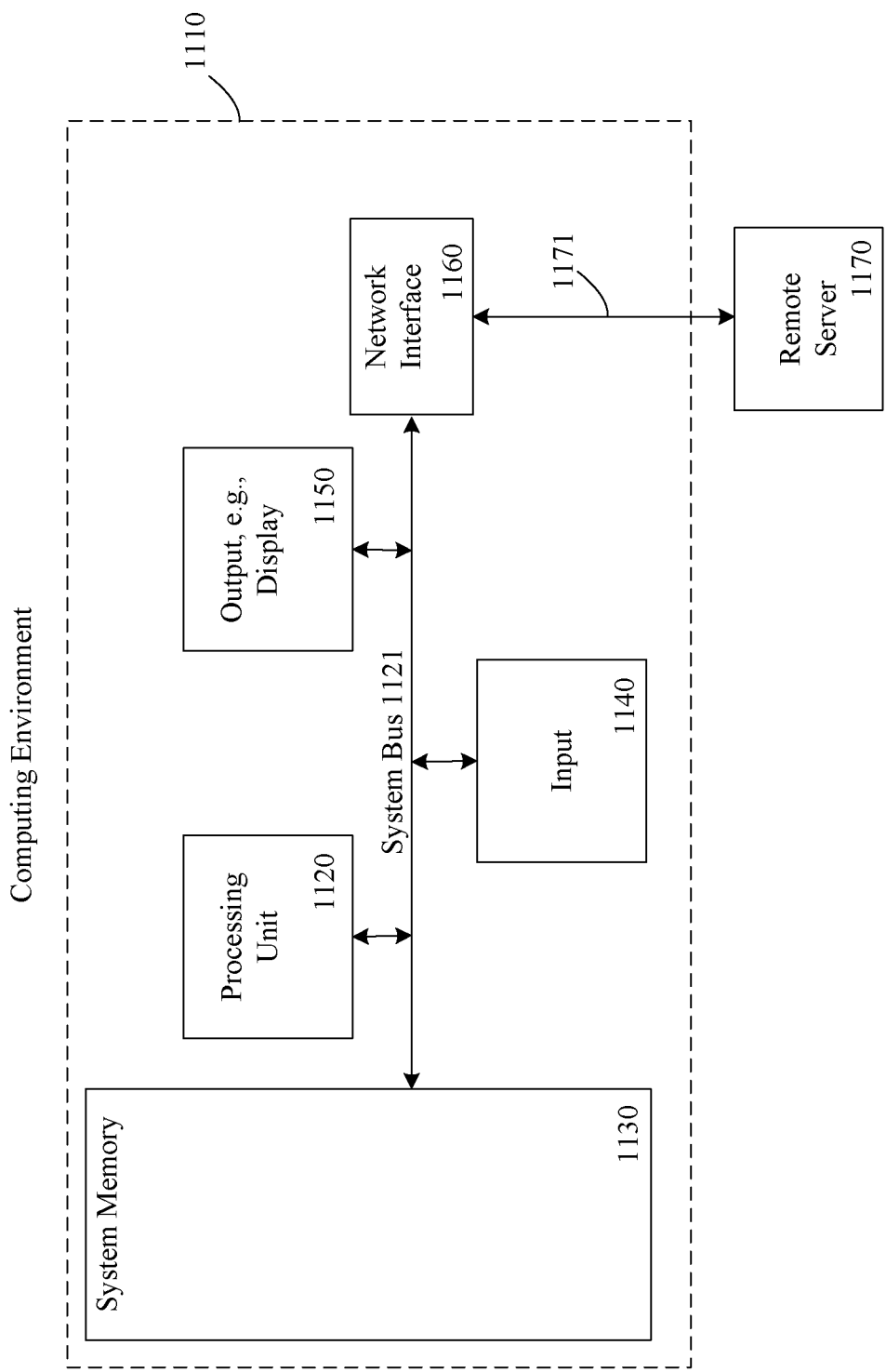
FIG. 11 illustrates an embodiment of the visualization system depicting a typical computing environment.

With reference to FIG. 11, an example of an environment for implementing various aspects described herein includes a general purpose computing device in the form of a computer 1110. Components of computer 1110 can include, but are not limited to, a processing unit 1120, a system memory 1130, and a system bus 1121 that couples various system components including the system memory to the processing unit 1120. The system bus 1121 can be any of several types of bus structures including a memory bus or memory controller, a peripheral bus, and a local bus using any of a variety of bus architectures.

Computer 1110 can include a variety of computer readable media. Computer readable media can be any available media that can be accessed by computer 1110. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media can embody computer readable instructions, data structures, program modules or other data in a modulated data signal such as a carrier wave or other transport mechanism and can include any suitable information delivery media.

The system memory 1130 can include computer storage media in the form of volatile and/or nonvolatile memory such as read only memory (ROM) and/or random access memory (RAM). A basic input/output system (BIOS), containing the basic routines that help to transfer information between elements within computer 1110, such as during start-up, can be stored in memory 1130. Memory 1130 can also contain data and/or program modules that are immediately accessible to and/or presently being operated on by processing unit 1120.

By way of non-limiting example, memory 1130 can also include an operating system, application programs, other program modules, and program data.

The computer 1110 can also include other removable/non-removable, volatile/nonvolatile computer storage media. For example, computer 1110 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1121 through a non-removable memory interface such as an interface, and a magnetic disk drive or optical disk drive can be connected to the system bus 1121 by a removable memory interface, such as an interface.

A user can enter commands and information into the computer 1110 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1120 through user input 1140 and associated interface(s) that are coupled to the system bus 1121, but can be connected by other interface and bus structures, such as a parallel port, game port or a universal serial bus (USB). A graphics subsystem can also be connected to the system bus 1121. In addition, a monitor or other type of display device can be connected to the system bus 1121 via an interface, such as output interface 1150, which can in turn communicate with video memory. In addition to a monitor, computers can also include other peripheral output devices, such as speakers and/or a printer, which can also be connected through output interface 1150.

The computer 1110 can operate in a networked or distributed environment using logical connections to one or more other remote computers, such as remote server 1170, which can in turn have media capabilities different from device 1110. The remote server 1170 can be a personal computer, a server, a router, a network PC, a peer device or other common network node, and/or any other remote media consumption or transmission device, and can include any or all of the elements described above relative to the computer 1110. The logical connections depicted in FIG. 11 include a network 1171, such local area network (LAN) or a wide area network (WAN), but can also include other networks/buses. Such networking environments are commonplace in homes, offices, enterprise-wide computer networks, intranets and the Internet.

When used in a LAN networking environment, the computer 1110 is connected to the LAN 1171 through a network interface or adapter. When used in a WAN networking environment, the computer 1110 can include a communications component, such as a modem, or other means for establishing communications over the WAN, such as the Internet. A communications component, such as a modem, which can be internal or external, can be connected to the system bus 1121 via the user input interface at input 1140 and/or other appropriate mechanism. In a networked environment, program modules depicted relative to the computer 1110, or portions thereof, can be stored in a remote memory storage device. It should be appreciated that the network connections shown and described are exemplary and other means of establishing a communications link between the computers can be used.

Figure 12:
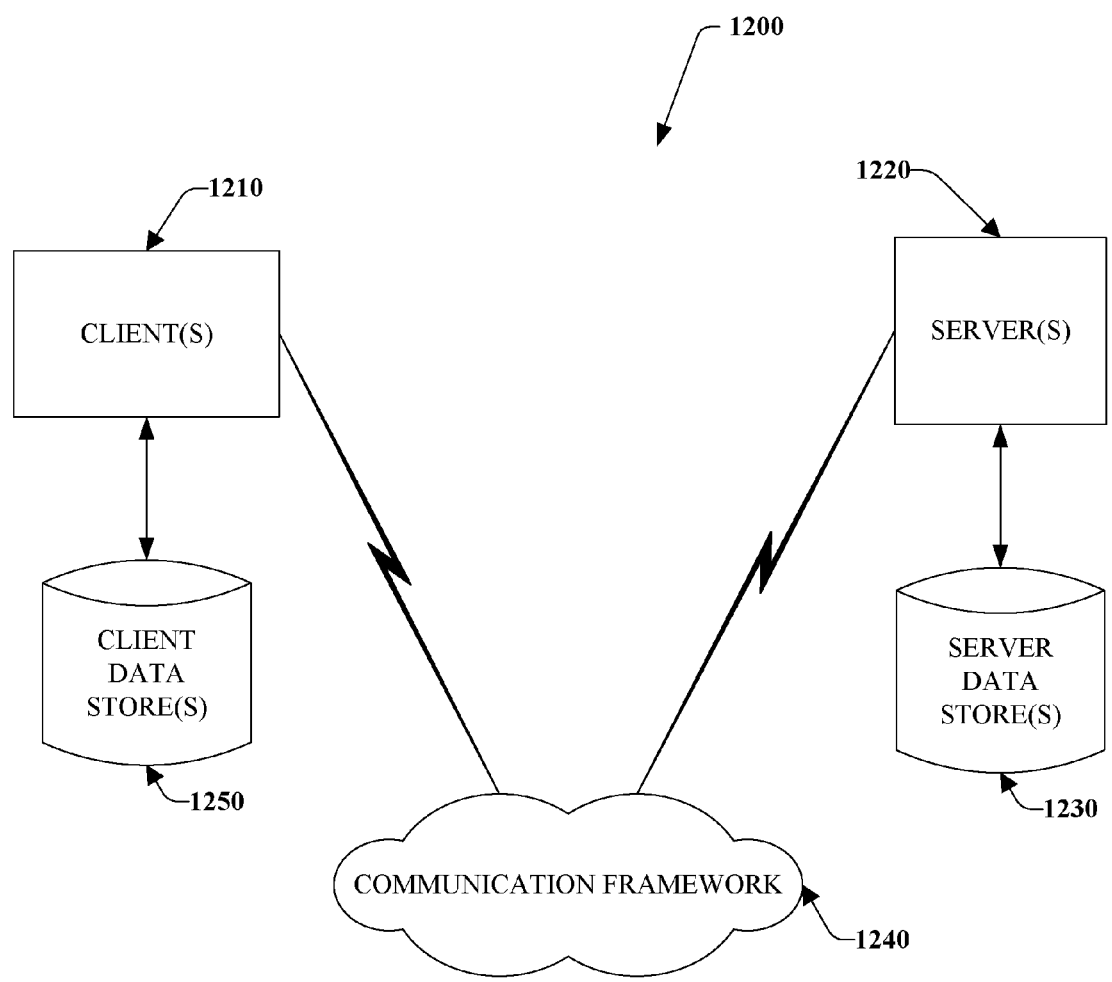
FIG. 12 illustrates an embodiment of the visualization system depicting the interaction between a visualization client and a visualization server.

FIG. 12 is a schematic block diagram of a sample-computing environment 1200 within which the disclosed and described components and methods can be used. The system 1200 includes one or more client(s) 1210. The client(s) 1210 can be hardware and/or software (for example, threads, processes, computing devices). The system 1200 also includes one or more server(s) 1220. The server(s) 1220 can be hardware and/or software (for example, threads, processes, computing devices). The server(s) 1220 can house threads or processes to perform transformations by employing the disclosed and described components or methods, for example. Specifically, one component that can be implemented on the server 1220 is a security server. Additionally, various other disclosed and discussed components can be implemented on the server 1220.

One possible means of communication between a client 1210 and a server 1220 can be in the form of a data packet adapted to be transmitted between two or more computer processes. The system 1200 includes a communication framework 1240 that can be employed to facilitate communications between the client(s) 1210 and the server(s) 1220. The client(s) 1210 are operably connected to one or more client data store(s) 1250 that can be employed to store information local to the client(s) 1210. Similarly, the server(s) 1220 are operably connected to one or more server data store(s) 1230 that can be employed to store information local to the server(s) 1240.

Figure 13:
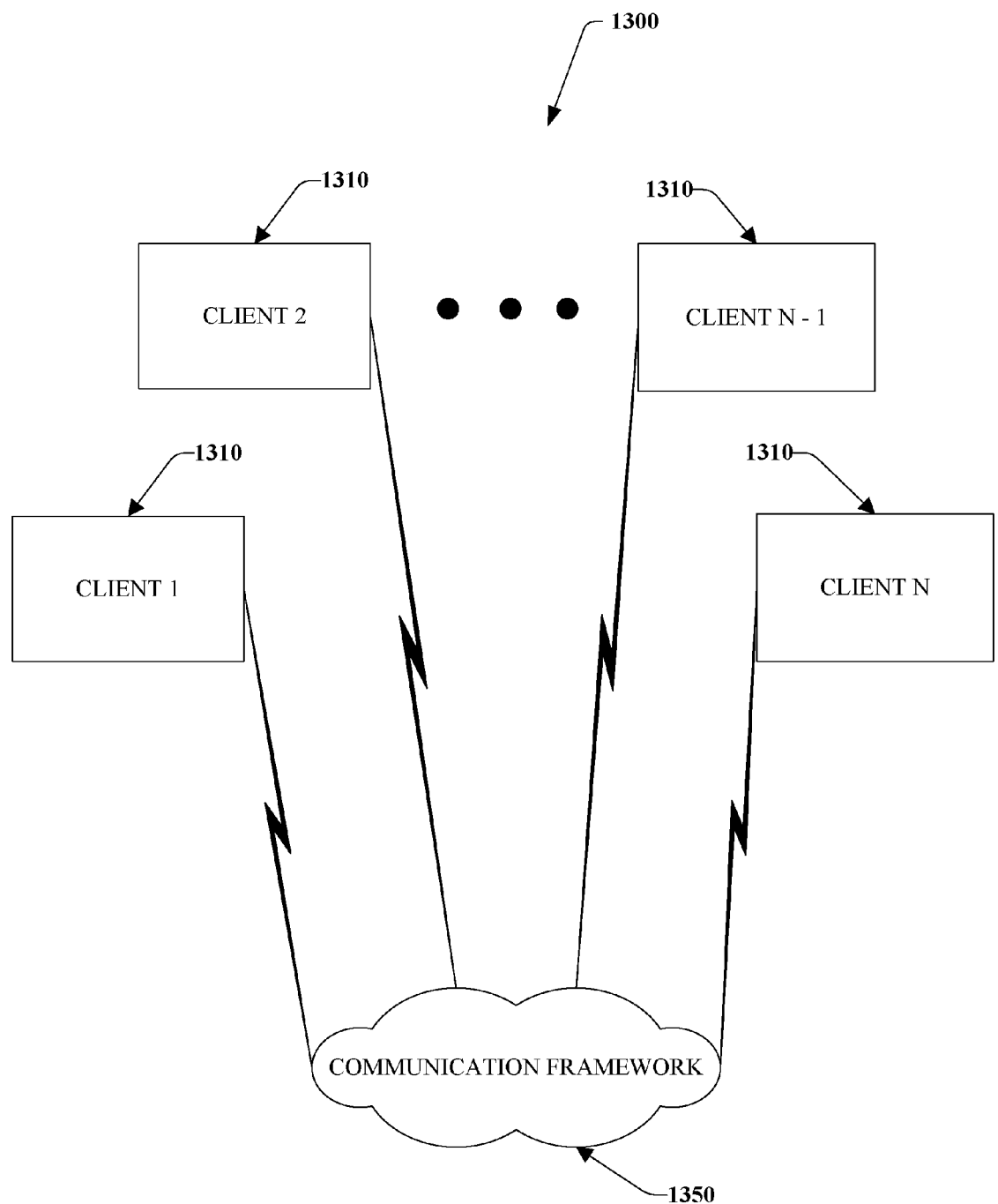
FIG. 13 illustrates an embodiment of the visualization system depicting the interaction between multiple visualization clients.

Referring again to the drawings, FIG. 13 illustrates an embodiment of the subject invention where a plurality of client systems 1310 can operate collaboratively based on their communicative connection. For instance, as described previously, a data overlay visualization system 100 can transmit an updated preconfigured process problem solution model to a plurality of data overlay visualization systems 100 to share the experience and knowledge of an operator with others. In another example, the data overlay visualization systems 100 can operate in a series fashion, allowing an operators' communication received by data overlay visualization system client 1 to transmit the information to data overlay visualization system 100 client 2 which proceeds to transfer the information to data overlay visualization system 100 client N−1 and in a similar fashion transmits the information to data overlay visualization system 100 client N where the information is transmitted to a server 1320.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

What is claimed is:

1. An industrial automation visualization system, the system comprising:
    a processor;
    a memory communicatively coupled to processor, the memory having stored therein computer-executable instructions, comprising:
        a data source component configured to receive a first user input of a selection of a plurality of data sources to include in a model for generating one or more overlay display graphics;
        an overlay component configured to receive a second user input of a selection of a plurality of overlays to include in the model;
        an overlay filters component configured to receive third user input specifying one or more filters, to include in the model, defining a combination of data sources, of the plurality of data sources, that are not permitted to be included collectively in an overlay display graphic of the one or more overlay display graphics; and
        an overlay model component configured to create the model based upon the selection of the plurality of data sources, the selection of the plurality of overlays, and the one or more filters.

2. The system of claim 1, further comprising:
    an overlay rules component configured to receive fourth user input specifying one or more rules, to include in the model, defining a combination of overlays, of the plurality of overlays, that are not permitted to be included collectively in the overlay display graphic; and
    wherein the overlay model component is further configured to create the model further based upon the one or more rules.

3. The system of claim 1, further comprising:
    an overlay rules component configured to receive fourth user input specifying one or more rules, to include in the model, defining an overlay that must be included with a specified overlay in the overlay display graphic; and
    wherein the overlay model component is further configured to create the model further based upon the one or more rules.

4. The system of claim 1, further comprising:
    an overlay rules component configured to receive fourth user input specifying one or more rules, to include in the model, defining one or more graphical display devices that are permitted to display the overlay display graphic; and
    wherein the overlay model component is further configured to create the model further based upon the one or more rules.

5. The system of claim 4, wherein the overlay rules component is further configured to receive fifth user input specifying one or more additional rules, to include in the model, defining when the one or more graphical display devices are permitted to display the overlay display graphic, and wherein the overlay model component is further configured to create the model further based upon the one or more additional rules.

6. The system of claim 1, further comprising:
    a data rules component configured to receive fourth user input specifying one or more rules, to include in the model, defining at least one allowable combination of data, from the plurality of data sources, to overlay in the overlay display graphic; and
    wherein the overlay model component is further configured to create the model further based upon the one or more rules.

7. The system of claim 1, wherein the overlay component is further configured to receive fourth user input to create one or more overlay charts to include in the model, and wherein the overlay model component is further configured to create the model further based upon the one or more charts.

8. The system of claim 1, further comprising:
    a data rules component configured to receive fourth user input specifying one or more rules, to include in the model, defining scaling of data values in the overlay display graphic; and
    wherein the overlay model component is further configured to create the model further based upon the one or more rules.

9. The system of claim 1, further comprising an interface component configured to collect data associated with the plurality of data sources to include in the overlay display graphic.

10. The system of claim 1, further comprising a visualization component configured to generate the overlay display graphic based on the model.

11. The system of claim 1, further comprising a data security component configured to control displaying of the overlay display graphic according to security credentials.

12. The system of claim 1, wherein the overlay filters component is further configured to receive fourth user input specifying one or more additional filters, to include in the model, defining a data source that must be included with a specified data source in the overlay display graphic, and wherein the overlay model component is further configured to create the model further based upon the one or more additional filters.

13. A method, comprising:
  receiving, by a system including a microprocessor, a first user input of a selection of a plurality of data sources to include in a model for generating one or more overlay display graphics;
  receiving, by the system, a second user input of a selection of a plurality of overlays to include in the model; and
  receiving, by the system, third user input specifying one or more filters, to include in the overlay model, defining a combination of data sources, of the plurality of data sources, that are not permitted to be included collectively in an overlay display graphic of the one or more overlay display graphics; and
  generating, by the system, the model based upon the selection of the plurality of data sources, the selection of the plurality of overlays, and the one or more filters.

14. The method of claim 13, further comprising:
  receiving, by the system, fourth user input specifying one or more rules, to include in the model, defining an overlay that must be included with a specified overlay in the overlay display graphic; and
  the generating the model is further based upon the one or more rules.

15. The method of claim 13, further comprising:
  receiving, by the system, fourth user input specifying one or more rules, to include in the model, defining a combination of overlays, of the plurality of overlays, that are not permitted to be included collectively in the overlay display graphic; and
  the generating the model is further based upon the one or more rules.

16. The method of claim 13, further comprising:
  receiving, by the system, fourth user input specifying one or more rules, to include in the model, defining one or more graphical display devices that are permitted to display the overlay display graphic; and
  the generating the model is further based upon the one or more rules.

17. The method of claim 13, further comprising:
  receiving, by the system, fourth user input specifying one or more rules, to include in the model, defining at least one allowable combination of data, from the plurality of data sources, to overlay in the overlay display graphic; and
  the generating the model is further based upon the one or more rules.

18. A non-transitory computer-readable storage medium having instructions stored thereon that, in response to execution, cause at least one device to perform operations comprising:
  receiving a first user input of a selection of a plurality of data sources to include in a model for generating one or more overlay display graphics;
  receiving a second user input of a selection of a plurality of overlays to include in the model; and
  receiving third user input specifying one or more filters, to include in the model, defining a combination of data sources, of the plurality of data sources, that are not permitted to be included together in an overlay display graphic of the one or more overlay display graphics; and
  configuring the model based upon the selection of the plurality of data sources, the selection of the plurality of overlays, and the one or more filters.

19. The non-transitory computer-readable storage medium of claim 18, the operations further comprising:
  receiving fourth user input specifying one or more rules, to include in the model, defining an overlay that must be included with a specified overlay in the overlay display graphic; and
  the configuring the model is further based upon the one or more rules.

20. The non-transitory computer-readable storage medium of claim 18, the operations further comprising:
  receiving fourth user input specifying one or more rules, to include in the model, defining a combination of overlays, of the plurality of overlays, that are not permitted to be included collectively in the overlay display graphic; and
  the configuring the model is further based upon the one or more rules.

21. The non-transitory computer-readable storage medium of claim 18, the operations further comprising:
  receiving fourth user input specifying one or more rules, to include in the model, defining one or more graphical display devices that are permitted to display the overlay display graphic; and
  the configuring the model is further based upon the one or more rules.

* * * * *